United States Patent

[11] 3,600,606

[72] Inventor Anthony G. Clor, Jr.
 Utica, Mich.
[21] Appl. No. 705,654
[22] Filed Feb. 15, 1968
[45] Patented Aug. 17, 1971
[73] Assignee Design Products Corporation
 Troy, Mich.

[54] VOLTAGE COMPARATOR
 11 Claims, 2 Drawing Figs.
[52] U.S. Cl. ................................................... 307/235,
 328/147, 328/148, 330/30, 330/69
[51] Int. Cl. ...................................................... H03k 5/20

[50] Field of Search ............................................ 328/146,
 147, 148; 307/235; 330/300, 69

[56] References Cited
 UNITED STATES PATENTS
 3,466,552 9/1969 Sels ................................. 307/295
 3,351,927 11/1967 Stinson ........................... 328/148
 3,407,389 10/1968 Klein ............................... 307/291

Primary Examiner—Donald D. Forrer
Assistant Examiner—David M. Carter
Attorney—Harness, Dickey & Pierce ABSTRACT: A voltage comparator providing an indication of a voltage balance and separate indications of unbalance on either side of balance.

INVENTOR.
Anthony G. Clor, Jr.
BY Harness, Dickey & Pierce
ATTORNEYS

VOLTAGE COMPARATOR

The present invention relates to voltage comparators and more particularly to an improved comparator capable of providing an indication of a voltage balance between two signals as well as an indication of an unbalance on one side of balance and another indication of an unbalance on the other side of balance.

Conventional comparators provide a signal indicating the presence or absence of a balance or null. It is desirable to be able to determine whether, in the absence of a null or balance condition, the unbalance is on the positive or negative side of balance or null. Therefore, it is an object of the present invention to provide a novel and useful comparator for providing indications of balance between two signals as well as separate indications of unbalance on opposite sides of balance.

It is also desirable to have the sensitivity of the comparator varied such that the points of indication of the absence of balance can be varied. Therefore, it is another object of the present invention to provide a comparator having a capability of providing an indication of unbalance on either side of balance with the point of this indication being selectively variable.

It is a general object of the present invention to provide a novel voltage comparator.

Figure 1A:
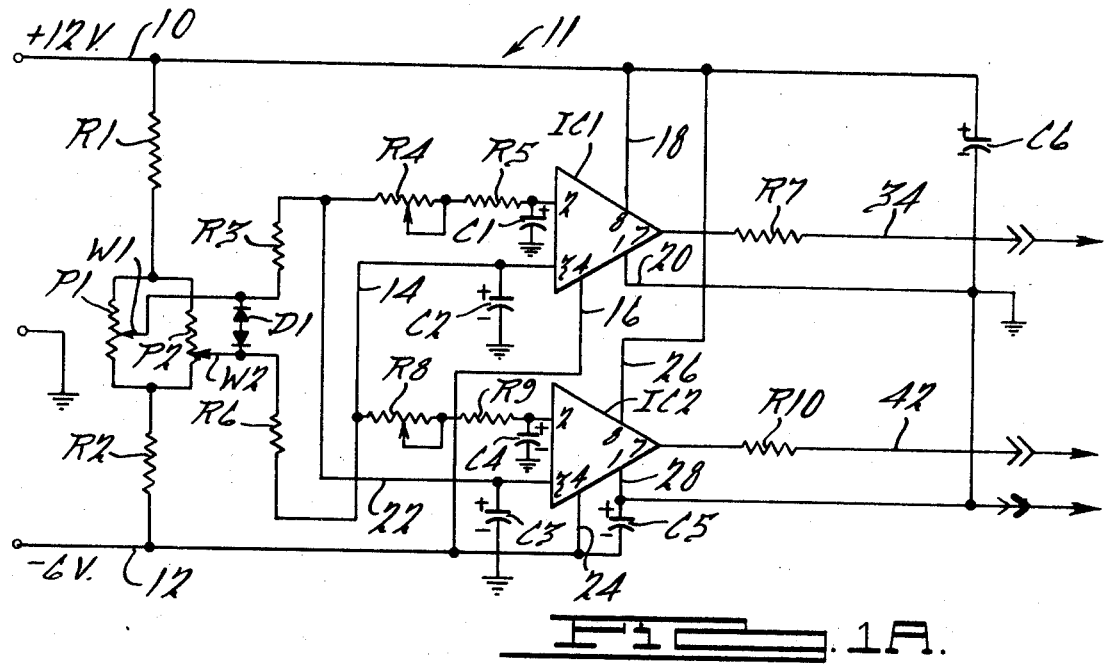
Figure 1B:
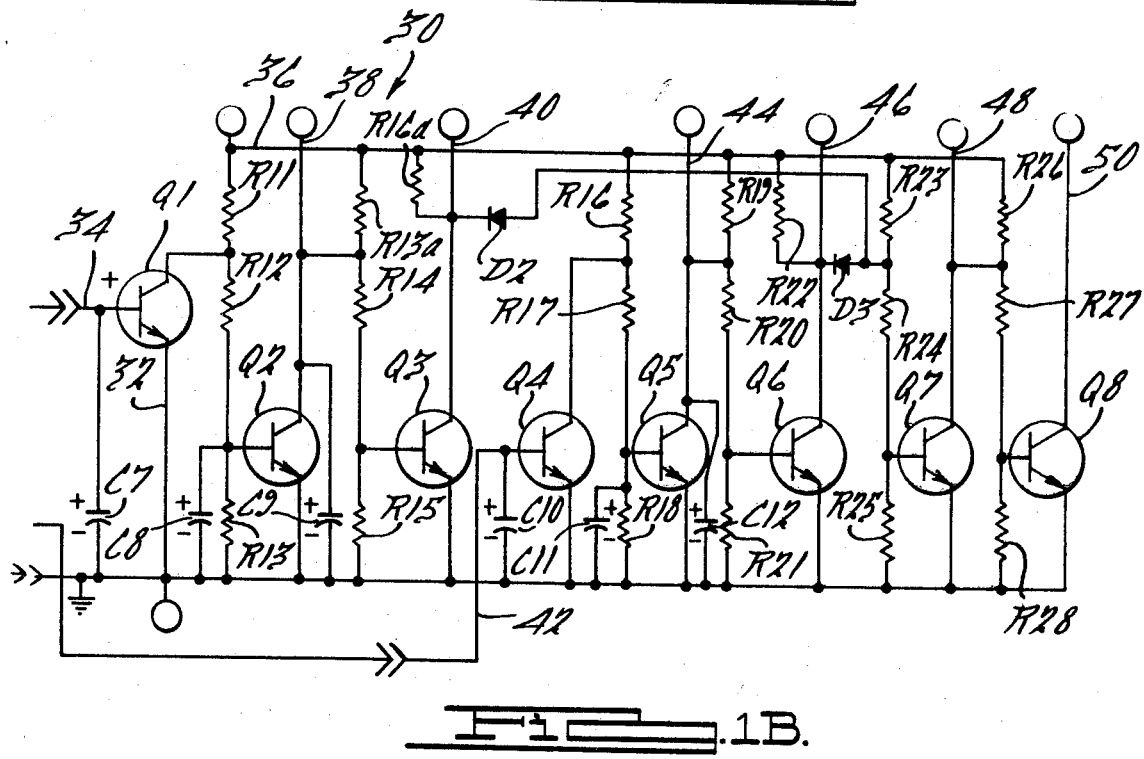

Other objects, features, and advantages of the present invention will become apparent from the subsequent description and the appended claims, taken in conjunction with the accompanying drawings, in which:

FIGS. 1A and 1B are an electrical schematic diagram of the voltage comparator of the present invention.

In the present invention, in order to provide for the indication of the absence of balance or null and the side (positive or negative) of the unbalance, two comparator circuits are utilized.

Looking now to the drawing, an input circuit 11 (FIG. 1A) includes a pair of potentiometers, P1 and P2, which are connected in parallel with one side being connected to a plus 12 voltage line 10 by means of a resistor R1; the other side of the potentiometers are connected to a negative 6 volt line 12 by means of a second resistor R2. Potentiometers P1 and P2 have wipers W1 and W2, respectively, and can be considered as master and slave, respectively, for purposes of convenience. For example in one application the wiper W1, for the master, will be set at a specific position along the potentiometer P1. The wiper W2, for the slave, could be arranged to move with a movable part whose movement was preselected to terminate at a desired point which was set by wiper W1. The wiper W2 could be connected to the movable part such that at the desired point the wiper W2 would be in a position along P2 which is identical to the position of wiper W1 along potentiometer P1. In this case (in a manner to be seen) a balance would occur and an indication of balance would be provided. If the movable member stopped short of the desired point the relative position of wipers W1 and W2 would not coincide and an appropriate unbalance signal would be provided indicating that the wiper W2 had not attained a balance position that the also that the (movable part) wiper W2 had not travelled far enough. On the other hand, if the movable part moved beyond the desired point i.e., moving wiper W2 beyond the position of relative coincidence with wiper W1, then a different signal would be provided indicating an unbalance and also that the (movable part) wiper 2 had travelled too far. Note then that not only is there an indication of unbalance but also an indication of the polarity of the unbalance. This advantageous result is obtained by the use of a novel arrangement of two voltage comparators IC1 and IC2.

The voltage comparators IC1 and IC2 are of identical types; in one form of the invention an integrated circuit has been used with comparator IC1 and IC2 being the type 710C manufactured by the Fairchild Semi-Conductor Division (otherwise referred to as part No. U5B771039X). The characteristics of the integrated circuits IC1 and IC2 are such that two input signals are applied and when the difference between the two input signals is greater than 5 millivolts one output signal will be provided, and when the difference between the two input signals is less than 5 millivolts a different output signal will be provided. The input signals are applied at points 2 and 3 of both IC1 and IC2, and output signals are derived at point 7 for both IC1 and IC2. Bias is applied at points 1, 4, and 8 of integrated circuits of IC1 and IC2. The wipers W1 and W2 (the output from potentiometers P1 and P2) are applied to both IC1 and IC2 and the difference in potential between both signals is sensed by the integrated circuits. A pair of back-to-back diodes D1 are connected across wipers W1 and W2 to provide for transient voltage protection for IC1 and IC2. Wiper W1 is connected to the input point 2 of IC1 via a current limiting resistor R3, a variable resistor R4, and a biasing resistor R5. A capacitor C1 connects the input point 2 to ground and acts as a bypass for high frequency noise, etc. The wiper W2 is connected to the second input at point 3 for IC1 via a current limiting resistor R6 and a conductor 14. A bypass capacitor C2, similar to capacitor C1, is connected from point 3 to ground. Point 4 is connected to the minus 6 volt line 12 via a conductor 16, while the bias point 8 is connected to the positive 12 volt line 10 via a conductor 18 and to ground via a bypass capacitor C6. Point 1 is connected to ground or common via a conductor 20. When the positions of the wipers W1 and W2 are such as to provide for an unbalance between their potentials, i.e., greater than 5 millivolts difference between points 2 and 3, the integrated circuit IC1 will be placed in a conductive condition and the first output signal will be conducted from the output point 7 through a current limiting resistor R7. When the wiper W2 is moved to a position generally coincident with the position (voltage) of wiper W1, the 5 millivolt difference between points 2 and 3 will have been eliminated and the integrated circuit IC1 will be rendered generally nonconductive (or slightly negative) and the second output signal will appear at point 7. Note that by the proper selection of the impedances, R3, R4, R5, the amount of unbalance required between wipers W1 and W2 to provide for the 5 millivolt difference between points 2 and 3 can be preset. The adjustment provided by the variable resistor R4 permits relative variation of the point at which a balance is indicated by the integrated circuit IC1 and thus by varying the wiper of the variable resistor R4 the circuit IC1 can be rendered more or less sensitive to differences in relative positions between wipers W1 and W2. Note that the comparator circuit provides two pieces of information. In the first place, it provides a second output signal indicating the occurrence of a balance or relative coincidence between wipers W1 and W2. In addition, however, it indicates one side of balance at which the wiper W2 will be in an unbalanced condition relative to wiper W1. For example, as the wiper W2 approaches the same (voltage) position relative to wiper W1, the integrated circuit IC1 will be conductive indicating then that the wiper W2 is on the negative or low voltage side of wiper W1. As wiper W2 reaches a position of coincidence (or within the limits set by resistors R3, R4 and R5) the conduction will be terminated whereby the integrated circuit IC1 will indicate substantial coincidence or balance in the relative positions of wipers W1 and W2. However, if the wiper W2 were to continue to travel through the null or balance position, the conductive state of integrated circuit IC1 would not change and IC1 would remain nonconductive. Hence, without additional circuitry there would be no means of detecting unbalance on the positive side of the wiper W1. An indication of an unbalance on the positive side of balance or null is provided by the integrated circuit IC2.

The integrated circuit IC2 is connected to the wipers W1 and W2 in a manner the reverse of the integrated circuit IC1, and hence, the wiper W1 is connected to the input 3 of IC2 via a conductor 22 with this point 3 being connected to ground via a bypass capacitor C3. The wiper W2 is connected to the input point 2 of IC2 via current limiting resistor R6, variable resistor R8 and a bias resistor R9. The point 2 is also connected to ground via a bypass capacitor C4. Point 4 of IC2 is connected to the minus 6 volt supply via line 12 via conductor 24, while point 8 is connected to the positive 12 volt line 10 via a conductor 26. Point 1 is connected to ground via conductor 28. The output at point 7 is connected via a current limiting resistor R10.

The minus 6 volt conductor 12 is connected to ground via a bypass capacitor C5. The integrated circuit IC2 functions in the reverse manner of integrated circuit IC1, and hence, if the wiper W2 is at the negative side of the wiper W1 the integrated circuit IC2 will be maintained nonconductive (as it would in a null or balance condition). As wiper W2 is moved past the position of relative coincidence with wiper W1 to the positive side thereof and to a point at which the potential difference at points 2 and 3 of IC2 exceeds 5 millivolts, then the integrated circuit IC2 will be rendered conductive and an output signal will be transmitted via resistor R10. Note then that IC1 and IC2 will be alternately conductive, i.e., with IC1 being conductive with W2 on the negative side of the wiper W1 (IC2 being nonconductive) and with IC2 being conductive with wiper W2 on the positive side of wiper W1 (IC1 being nonconductive) and with both IC1 and IC2 being nonconductive at a null or balance position. The above variations in conductive conditions is used in the succeeding circuitry to provide a proper indication of the condition of the relative positions of wipers W1 and W2. The output from integrated circuits IC1 and IC2 are connected to an output circuit 30 (FIG. 1B). The output circuit 30 includes a first NPN transistor Q1 which has its base connected to ground via a bypass capacitor C7. Q1 has its emitter connected to ground via a conductor 32 and its base connected to the output resistor R7 via a conductor 34. The collector of transistor Q1 is connected to a voltage divider network which comprises resistors R11, R12 and R13, which are serially connected between a plus 24 volt conductor 36 and ground. The collector of transistor Q1 is connected to the juncture between resistors R11 and R12. Transistor Q1 is rendered conductive upon conduction of IC1; with Q1 conducting the point between resistors R11 and R12 is rendered negative. A second NPN transistor Q2 has its base connected to ground via the resistor R13 and a bypass capacitor C8. In addition, the Q2 has its collector connected to a voltage divider comprising resistors R13$_a$, R14, and resistor R15, all of which are serially connected with the collector of Q2 being connected at the juncture of resistors R13$_2$ and R14. The collector of transistor Q2 is also connected to ground via a bypass capacitor C9 while the emitter is connected directly to ground. Transistor Q2 is normally conductive and is rendered nonconductive when transistor Q1 is turned on or rendered conductive. An output conductor 38 is connected to the collector of transistor Q2 to provide an output signal indicating the conductive condition of transistor Q2 and could, for example, be connected to an indicating light. The output circuit portion 30 includes several output conductors all of which will be explained later.

An output transistor Q3 which is of the NPN type has its base connected to ground via the resistor R15 and has its emitter connected directly to ground and has its collector connected to the positive 24 volt conductor 36 via a resistor R16$_2$. An output conductor 40 is also connected to the collector of transistor Q3. Transistor Q3 is normally nonconductive and is rendered conductive when transistor Q2 is rendered nonconductive and is turned off until Q1 is rendered conductive. Hence transistors Q1 and Q3 will follow each other in conductive condition, while transistor Q2 and the output conductor 34 of the integrated circuit IC1 will follow each other in conductive condition. Note that the output conductors 38 and 40 provide for reverse outputs as to the conductive condition of the integrated circuit IC1.

The integrated circuit IC2 is connected to a NPN transistor Q4 via an output conductor 42 which is connected to its base; transistor Q4 has its emitter connected to ground and its base is also connected to ground via a bypass capacitor C10. Q4 is connected similarly to transistor Q2 and hence is connected to a voltage divider network comprising resistors R16, R17, and R18, all of which are connected in series between the conductor 36 and ground with the collector of transistor Q4 being connected between resistors R16 and R17. The transistor Q4 is normally nonconductive and is rendered conductive upon conduction of the integrated circuit IC2 via conductor 42. Note that transistors Q4, Q5 and Q6 (to be described) are similar in relationship with regard to integrated circuit IC2 are as transistors Q1, Q2 and Q3 with regard to integrated circuit IC1. Transistor Q5 (similar to transistor Q2) is of the NPN type and has its base connected to ground via resistor R18 and the bypass capacitor C11 and has its emitter connected directly to ground and has its collector connected to ground via bypass capacitor C12; Q5 is connected to a voltage divider network comprised of resistors R19, R20 and R21, all of which are serially connected between the conductor 36 and ground. The collector of Q5 is connected between resistors R19 and R20. The collector also has an output conductor 44 connected thereto for providing an output signal. The transistor Q5 is rendered nonconductive by conduction of transistor Q4 which renders the point between resistors R16 and R17 negative. The output of transistor Q5 is transmitted to NPN transistor Q7 (similar to transistor Q3), which has its emitter connected to ground and its base connected to ground via resistor R21. The collector of transistor Q6 is connected to the conductor 36 via a resistor R22. An output conductor 46 is also connected to the collector of transistor Q6. Transistor Q6 is rendered conductive upon transistor Q5 being rendered nonconductive and is rendered nonconductive upon transistor Q5 being rendered conductive. Thus the transistors Q5 and Q6 will provide outputs at conductors 44 and 46, respectively, which are the reverse of each other and which indicate the conductive condition of the integrated circuit IC2 with transistors Q4 and Q6 generally following the conduction of integrated circuit IC2 and with the transistor Q5 providing the inverse of the conduction of integrated circuit IC2.

Transistors Q7 and Q8 provide opposite or reverse outputs indicating the existence of a balance and an unbalance, respectively. Transistor Q7 is of the NPN type and has its emitter connected directly to ground and has its base connected to a voltage divider comprising resistors R23, R24, and R25, all of which are serially connected between conductors 36 and ground. The base of transistor Q7 is connected between resistors R24 and R25. The collector of transistor Q7 is connected to an output conductor 48. A diode D2 is connected between the collector of transistor Q3 (associated with the integrated circuit IC1) and the base of transistor Q7 via the juncture of resistors R23 and R24. Another diode D3 is connected between the collector of transistor Q6 (associated with the integrated circuit IC2) and the base of Q7 at the juncture of resistors R23 and R24. When transistor Q3 is rendered conductive and its collector is rendered generally negative, this signal is transmitted via the diode D2 to the base of transistor Q7 rendering the transistor Q7 nonconductive. Likewise, when transistor Q6 is rendered conductive and its collector is rendered negative, this negative signal is transmitted via diode D3 to the base of Q7 rendering Q7 nonconductive. Therefore, when either of the transistors Q3 or Q6 is conducting, transistor Q7 will be nonconductive. Note that transistors Q3 and Q6 will be rendered conductive only when the associated integrated circuits IC1 and IC2, respectively, are conductive indicating that there is an absence of balance or null. In this case, then without balance or null, the transistor Q7 will be maintained nonconductive. However, in a situation in which there is a null or balance and both integrated circuits IC1 and IC2 are rendered nonconductive, the negative bias at the base of transistor Q7 no longer appears via diodes D2 and D3. Transistor Q7 can then conduct and a signal will appear at conductor 48 indicating the presence of a null or balance. The opposite of this signal is provided by means of transistor Q8, the conduction of which is controlled by the conduction of transistor Q7. Transistor Q8 is also an NPN type transistor having its emitter connected directly to ground and having its collector connected to an output conductor 50. The base of transistor Q8 is connected to a voltage divider network comprising resistors R26, R27 and R28 connected between conductor 36 and ground. The output of transistor Q7, however, is connected to the base of transistor Q8 via the connection of the collector of Q7 to the juncture between resistors R26 and R27. Thus, when transistor Q7 is rendered conductive, transistor Q8 is rendered nonconductive. Therefore, in the absence of a null or balance, transistor Q8 will be conductive providing a signal at the output conductor 50. When the null or balance occurs, the transistor Q8 will be rendered nonconductive and the signal appearing at conductor 50 will be extinguished; however, the transistor Q7 will be rendered conductive and a signal will appear at conductor 48.

In the event of an unbalance with the wiper W2 on the negative side of the wiper W1, whereby integrated circuit IC1 is rendered conductive, there will be a signal appearing at conductor 40. Upon a null condition or a condition in which the wiper W2 is on the positive side of the wiper W1, the signal at conductor 40 will be extinguished and a signal will appear at conductor 38. With regard to the integrated circuit IC2 in the event of the wiper W2 being located on the positive side of the wiper W1, and hence the integrated circuit IC2 being rendered conductive, a signal will appear at conductor 46. At the same time no signal will appear at conductor 44. However, in the event of the wiper W2 being located in a null condition or on the negative side of wiper W1, then a signal will appear at conductor 44 and no signal will appear at conductor 46.

Note then that with the output circuit 30 as shown, the condition of balance or unbalance can be readily determined by means of the output conductors 48 and 50, and in addition, in the event of unbalance the condition of the unbalance can be determined by output conductors 38, 40, 44 and 46 with conductors 38 and 40 providing an indication when the wiper W2 is on the negative side of the wiper W1 and with conductors 44 and 46 providing an indication when the wiper W2 is on the positive side of wiper W1. Thus, the circuit as shown and described will provide not only an indication of a null or balance but also an indication of unbalance and the condition of the unbalance. The capacitors C1 through C12, while providing an AC bypass function, are preselected to provide a time delay with their associated circuits in order to minimize hunting (or chatter) as the wipers W2 and W1 are moved near the points of relative balance. In the prior description, it should be understood that an indication of a particular condition can be provided either by a conductive state or by a nonconductive state and that in this sense the various output conductors are capable of providing a pair of signals.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What I claim is:

1. A voltage comparator circuit comprising first voltage comparator means for providing a first output signal in accordance with a first preselected difference between two signals, a second voltage comparator means for providing a second output signal in accordance with a second preselected difference between said two signals and output circuit means responsive to said first and second outputs for providing a final output signal, said final output signal including one signal indicating the difference between said two signals is within said first and second preselected differences, said final output signal further including a different signal indicating said two signals are not within said first and second preselected differences, said different signal including a first indication indicating the difference of said two signals is greater than said first preselected difference and second indication indicating the difference of said two signals is greater than said second preselected difference, said output circuit means including a first transistor responsive to the occurrence of both said first and second output signals for providing said one signal, and a second transistor for providing said first indication, a third transistor responsive to said second output signal for providing said second indication, said first transistor responsive to said first and second indications for providing said one signal.

2. The circuit of claim 1 with said final output signal including a different signal indicating the difference of said two signals is not within said first and second preselected differences.

3. The circuit of claim 2 with said different signal including a first indication indicating the difference of said two signals is greater than one of said first and second preselected differences.

4. The circuit of claim 3 with said different signal including a second indication indicating the difference of said two signals is greater than the other of said first and second preselected differences.

5. The circuit of claim 1 including first bias means selectively variable for adjusting the magnitude of one of said first and said second preselected differences.

6. The circuit of claim 5 including second bias means selectively variable for adjusting the magnitude of the other of said first and second preselected differences.

7. The circuit of claim 1 including first and second bias means selectively variable for adjusting the magnitude of said first and said second preselected differences, respectively.

8. The circuit of claim 7 with said first and second voltage comparator means each comprising a differential voltage comparator circuit.

9. The circuit of claim 8 including means for providing a signal in response to and the reverse of said one signal and said first and second indications.

10. The circuit of claim 1 including a first diode connected between said second and first transistors and a second diode connected between said third and first transistors.

11. The circuit of claim 10 including fourth, fifth and sixth transistors for providing the reverse signals of said first, second and third transistors, respectively.

UNITED STATES PATENT OFFICE
CERTIFICATE OF CORRECTION

Patent No. 3,600,606  Dated August 17, 1971

Inventor(s) Anthony G. Clor, Jr.

It is certified that error appears in the above-identified patent and that said Letters Patent are hereby corrected as shown below:

Column 1, line 58, "that the", second occurrence, should read -- and --. Column 3, line 45, "$R13_2$" should read -- $R13_a$ --; line 60, "$R16_2$" should read -- $R16_a$ --. Column 4, lines 8 and 9, "are as" should read -- as are --.

Signed and sealed this 11th day of April 1972.

(SEAL)
Attest:

EDWARD M. FLETCHER, JR.
Attesting Officer

ROBERT GOTTSCHALK
Commissioner of Patents